United States Patent Office 3,096,858
Patented July 9, 1963

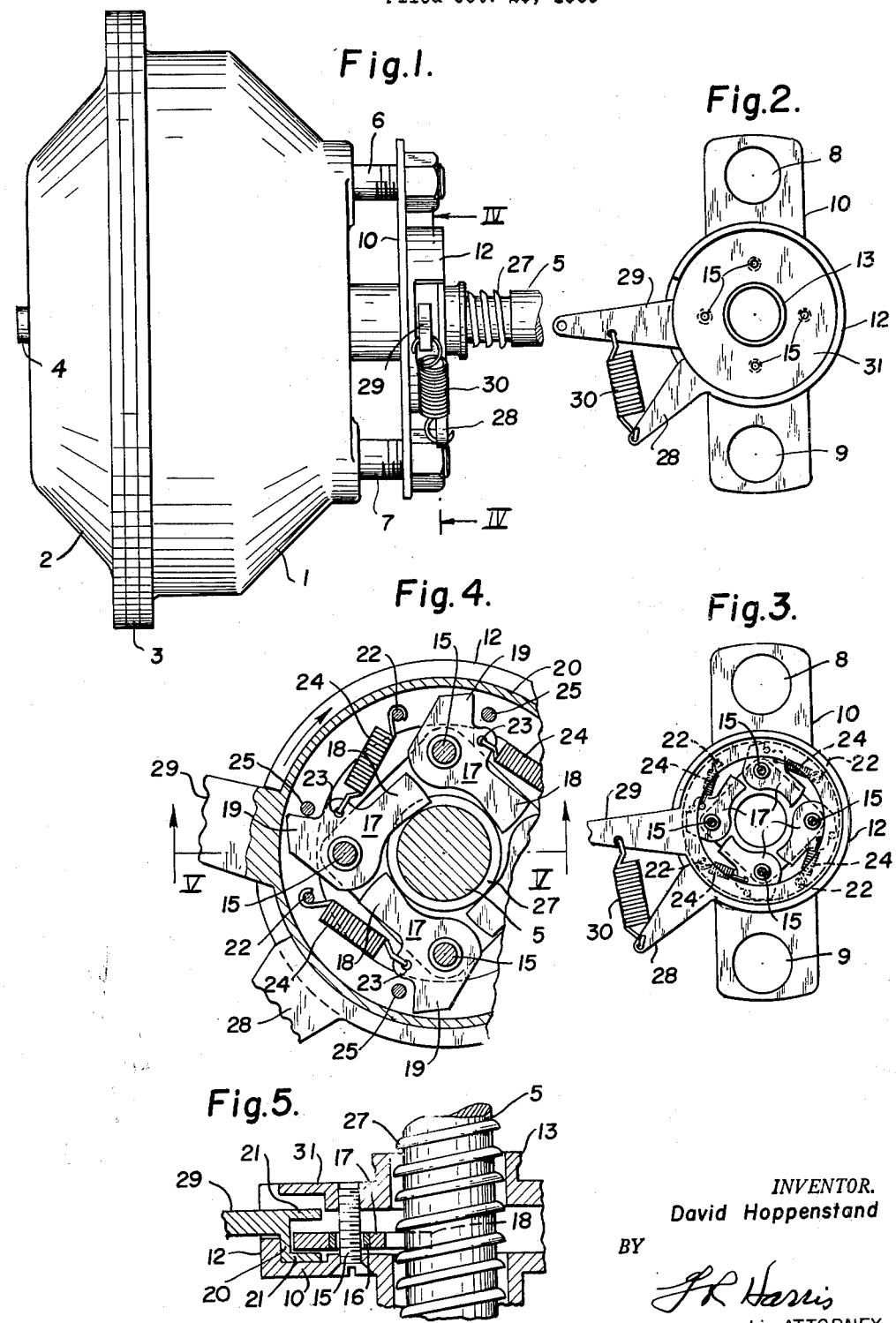
July 9, 1963    D. HOPPENSTAND    3,096,858
SHAFT LOCK
Filed Oct. 25, 1960
INVENTOR.
David Hoppenstand
BY
*J. R. Harris*
his ATTORNEY.

3,096,858
SHAFT LOCK
David Hoppenstand, Miami Beach, Fla., assignor to Transport Industries, Inc., Albion, Pa., a corporation of Pennsylvania
Filed Oct. 25, 1960, Ser. No. 64,967
7 Claims. (Cl. 188—82.7)

This invention relates to apparatus for locking a shaft against axial movement. It is more particularly concerned with apparatus capable of positively locking a shaft at a position in its travel which may be designated with any degree of precision desired.

The apparatus of my invention is well adapted for mechanically locking a braking device or the like and will be described hereinafter with reference to a fluid operated brake for a motor truck or trailer. Its usefulness, however, is not limited to automotive brakes.

Motor trucks, particularly those of high load carrying capacity, are commonly provided with power operated brakes. Those brakes are generally actuated by compressed air from a tank which is kept under pressure by a compressor driven by the truck engine. Trailers pulled by trucks or tractors are also provided with power operated brakes of the same sort. The trailers themselves usually carry pressure tanks so that their brakes may be operated when they are disconnected from the pulling vehicle. If a trailer fitted with air brakes is left unconnected from a source of air under pressure for any considerable time, the air pressure which sets the brakes may dissipate through leaks in the air lines, with the result that the air brakes no longer hold the trailer. Because of this possibility, it is especially desirable that trailers be provided with mechanical as well as air brakes.

Attempts have been made to provide a conventional air operated brake with a mechanical locking device which will hold the brake in the set position. Those locking devices usually take the form of a rack attached to or movable with a brake rod and a pawl or dog which drops between a pair of teeth on the rack to lock the brake. Those devices are not entirely satisfactory, however, for the reason that each rack tooth must have a finite thickness. It is only coincidence if the pawl falls between a pair of rack teeth when the brake is set hard. Therefore, those devices lock the shaft only at certain finite positions separated from each other by the thickness of a rack tooth, and it may be necessary to release the brake from its full-on position by as much as a thickness of a rack tooth in order to lock it.

It is an object of my invention, therefore, to provide a mechanical lock which positively locks a shaft at any position in its travel. It is another object to provide a rack type mechanical lock which positively locks a shaft at any position in its travel within a fraction of the width of a rack tooth. It is still another object to provide a mechanical lock as above described which has a ratchet action. It is still another object to provide a spring-urged mechanical lock with mechanism which prevents jamming of the lock in the event of failure of a spring. Other objects of my invention will appear in the course of the following description and explanation thereof.

An embodiment of my invention presently preferred by me is illustrated in the attached figure to which reference is now made.

FIGURE 1 is an elevation of the apparatus of my invention attached to a conventional air operated brake cylinder or motor.

FIGURE 2 is a plan view of the apparatus of my invention.

FIGURE 3 is a plan view of the apparatus of my invention with the cover plate removed.

FIGURE 4 is an enlarged view in section of a portion of my apparatus taken on the plane IV—IV of FIGURE 1.

FIGURE 5 is an enlarged view partially in section taken on the plane V—V of FIGURE 4.

The conventional brake operating cylinder of FIGURE 1 is formed of a housing 1 and a covering plate 2 fastened together by appropriate means so as to clamp between them a flexible diaphragm 3. An air inlet 4 is provided in covering plate 2. Within the cylinder a piston plate not shown abuts the diaphragm 3 and is attached to a brake operating rod or shaft 5 which extends outwardly out of the end of housing 1. Housing 1 is also provided with a pair of studs 6 and 7 which extend outwardly from its closed end.

My locking apparatus is assembled upon an elongated plate 10 provided at each end with mounting holes 8 and 9 positioned so as to fit over studs 6 and 7 of housing 1 and with a central circular opening 13 dimensioned to clear shaft 5. Affixed to plate 10 and centrally disposed about opening 13 is an upstanding cylindrical shell 12. Within shell 12 and symmetrically positioned about opening 13 and shaft 5 four screws 15—15 project from plate 10. Over each screw 15 is fitted a cylindrical spacer 16 so as to form a pivot. My apparatus is provided with four pawls 17—17 each pivotally mounted on a spacer 16. Each pawl 17 has a shaft-engaging end 18 and an end 19 projecting away from the shaft 5 approximately at right angles to end 18. The purpose of end 19 will be described hereinafter.

Rotatably fitting within shell 12 is a ring 20, the cross section of which is a U open toward shaft 5. The ends 19—19 of pawls 17—17 extend between flanges 21—21 which in section form the legs of the U. Through flanges 21—21 are fixed four pins 22—22 symmetrically positioned with respect to shaft 5. Pawls 17—17 are each provided with a hole 23 positioned intermediate pivot spacer 16 and end 19 and intermediate ends 18 and 19. Tension coil springs 24—24 connect pins 22—22 each with its associated pawl 17 through hole 23 therein so that rotation of ring 20 with respect to shell 12 pulls the ends 18—18 of the pawls 17—17 toward shaft 5.

Through flanges 21—21 are also fixed four pins 25—25 symmetrically positioned with respect to shaft 5. Each pin 25 is spaced directly adjacent an end 19 of a pawl 17 so as to form a stop for each pawl in a manner to be described.

Shaft 5 is provided with an external helical thread 27. The spacing between successive threads at their bases is slightly greater than the thickness of end 18 of pawl 17. The threads are approximately triangular in cross section, the pawl-engaging face being perpendicular to the shaft.

Shell 12 is provided with an outwardly extending arm 28 and ring 20 is provided with a somewhat longer outwardly extending arm 29. A tension spring 30 is connected between the end of arm 28 and a point inward of the end of arm 29. Lock actuating means not shown are connected to the end of arm 29. A cover plate 31 fits within shell 12 and is provided with tapped holes to receive the ends of screws 15—15.

The operations of my apparatus may be understood by reference to the attached figures in the light of the foregoing description. When arm 29 is moved away from arm 28, against the pull of spring 30, ring 20 is caused to rotate with respect to shell 12 in a clockwise direction as indicated by the arrow of FIGURE 4. Each pin 22 exerts a pull through its attached spring 24 on a pawl 17 in a direction to urge end 18 of the pawl towards shaft 5. The pawls which are urged against any portion of thread 27 stop there, and further rotation of ring 20 with respect to shell 12 merely stretches the springs 24—24 urging those pawls. The pawl which engages shaft 5 between threads provides a positive lock. It will be seen that the described embodiment of my apparatus with four pawls in effect divides the thickness of the thread on the shaft by four, so that a brake fitted with my apparatus can always be positively locked without releasing it more than one-fourth a thread thickness from the full-on position. My apparatus can be constructed with more or less than four pawls if desired.

Should a spring 24 break, my apparatus will not jam. The free pawl cannot move into engagement with shaft 5 unless ring 20 is rotated with respect to shell 12 because pin 25 acts as a stop with respect to end 19 of the pawl. When ring 20 is rotated, pin 25 is moved away from end 19 of the pawl, leaving it free to pivot under the action of gravity or other force. When ring 20 is rotated in a counter direction each pin 25 engages end 19 of its associated pawl and causes it to pivot so as to withdraw end 18 from shaft 5.

If, for any reason, a brake fitted with my locking apparatus should be locked therewith in less than full-on position, the brake can be moved to full-on position without releasing my locking apparatus. Movement of the shaft will cause the inclined face of the thread to bear against the locking pawl and raise it against the pull of the spring, as in a conventional spring ratchet device.

I claim:

1. Shaft locking apparatus comprising a threaded shaft, a shell surrounding the shaft and providing clearance therefor, a plurality of pawls pivotally mounted on the shell and distributed about the shaft, each pawl having a dimension axially of the shaft not greater than the corresponding distance between adjacent threads, means rotatably movable about the shaft with respect to the shell, and separate spring means connected between each pawl and the movable means whereby rotation of the movable means pulls anyone of said pawls yieldingly into a space between adjacent threads when said pawl overlies said space.

2. Apparatus of claim 1 in which the pawls are mounted on pivots parallel to the shaft.

3. Apparatus of claim 1 in which the pawls are mounted on pivots parallel to the shaft and the means movable with respect to the shell is a ring rotatable about its center with respect to the shell.

4. Apparatus of claim 3 in which the ring encloses the pivots and the separate spring means for each pawl are connected to each pawl at a point radially outwardly of its pivot.

5. Shaft locking apparatus comprising a threaded shaft, a shell surrounding the shaft and providing clearance therefor, a plurality of pawls pivotally mounted on the shell and distributed about the shaft, each pawl having a dimension axially of the shaft not greater than the corresponding distance between adjacent threads, means rotatably movable about the shaft with respect to the shell, separate spring means connected between each pawl and the movable means whereby movement of the movable means in one direction pulls anyone of said pawls yieldingly into a space between adjacent threads when said pawl overlies said space, an end projecting from each pawl so as to move away from the shaft when the pawl moves against the shaft, and a separate mating stop for each end fixed to the movable means so that movement of the movable means in the other direction causes each stop to make contact with its mating end and move the pawl away from the shaft.

6. Apparatus of claim 5 including spring means connected between the ring and the shell urging the ring to rotate in the direction causing the pawls to move away from the shaft.

7. Apparatus of claim 6 in which each stop and mating end are positioned with respect to each other so that the pawl is prevented from moving against the shaft except by movement of the movable means.

References Cited in the file of this patent

UNITED STATES PATENTS

| 766,690   | Grant  | Aug. 2, 1904  |
|-----------|--------|---------------|
| 1,721,227 | Manley | July 16, 1929 |
| 2,759,569 | Keehn  | Aug. 21, 1956 |
| 2,856,037 | Anop   | Oct. 14, 1958 |

FOREIGN PATENTS

| 895,079 | Germany | Oct. 29, 1953 |